United States Patent
Jessberger et al.

(10) Patent No.: US 8,409,311 B2
(45) Date of Patent: Apr. 2, 2013

(54) FILTERING DEVICE

(75) Inventors: Thomas Jessberger, Asperg (DE);
Markus Hanselmann, Lauffen a. N. (DE); Hans-Peter Scholl, Mundelsheim (DE); Klaus Waltenberg, Großbottwar (DE); Stefan Walz, Freiberg a. N. (DE); Jobst Eisengräber-Pabst, Benningen a. N. (DE); Andreas Pelz, Kornwestheim (DE); Johannes Lampert, Remseck (DE); Michael Thienel, Kasendorf (DE); Daniela Knodel, Sersheim (DE); Joachim Streich, Asperg (DE); Sascha Bauer, Auenwald (DE)

(73) Assignee: Mann+Hummel GmbH, Ludwigsburg (DE)

( * ) Notice: Subject to any disclaimer, the term of this patent is extended or adjusted under 35 U.S.C. 154(b) by 63 days.

(21) Appl. No.: 12/444,904

(22) PCT Filed: Sep. 5, 2007

(86) PCT No.: PCT/EP2007/059297
§ 371 (c)(1),
(2), (4) Date: Apr. 17, 2009

(87) PCT Pub. No.: WO2008/043611
PCT Pub. Date: Apr. 17, 2008

(65) Prior Publication Data
US 2010/0005766 A1    Jan. 14, 2010

(30) Foreign Application Priority Data
Oct. 12, 2006   (DE) ..................... 20 2006 015 784 U

(51) Int. Cl.
*B01D 50/00*    (2006.01)
*B01D 59/50*    (2006.01)
*B01D 46/00*    (2006.01)
*B01D 47/00*    (2006.01)
*B01D 49/00*    (2006.01)
*B01D 53/00*    (2006.01)
*B01D 57/00*    (2006.01)
*B01D 45/00*    (2006.01)
*B01D 25/00*    (2006.01)
*B01D 27/00*    (2006.01)
*B01D 24/00*    (2006.01)
*B01D 21/24*    (2006.01)
*B01D 33/00*    (2006.01)

(52) U.S. Cl. ............. 55/385.3; 55/361; 55/481; 55/377; 55/378; 55/379; 210/445; 210/446; 210/447; 210/448; 210/449; 210/450; 210/451; 210/452; 210/453; 210/454; 210/455; 210/456; 210/457; 210/458; 210/459; 210/460; 210/461

(58) Field of Classification Search ................ 55/385.3, 55/377–379, 481, 361; 210/445–461, 455–431
See application file for complete search history.

(56) References Cited

U.S. PATENT DOCUMENTS 1,898,623 A * 2/1933 Gammeter ................. 285/96
2,068,837 A * 1/1937 Aronson ..................... 210/314
(Continued)

FOREIGN PATENT DOCUMENTS
DE          10052166     *   6/2007

OTHER PUBLICATIONS
Homi Nobuyuki, English Translation of DE 10052166, Jun. 7, 2001.*

*Primary Examiner* — Amber Orlando
(74) *Attorney, Agent, or Firm* — James Hasselbeck

(57) ABSTRACT

The invention relates to a filtering device, comprising a tubular filter element and a carrier part, with the filter element fastened thereon. The carrier part can be inserted between an unfiltered fluid pipe and a filtered fluid pipe. The pipes can be assembled into a continuous flow pipe, wherein the filter element protrudes into the pipe interior.

13 Claims, 2 Drawing Sheets

U.S. PATENT DOCUMENTS

| | | | | |
|---|---|---|---|---|
| 2,068,858 A * | 1/1937 | Jones | | 55/482 |
| 2,635,901 A * | 4/1953 | Osborn | | 285/33 |
| 2,808,937 A * | 10/1957 | O'Meara | | 210/445 |
| RE24,651 E * | 5/1959 | Anderson | | 277/603 |
| 3,151,891 A * | 10/1964 | Sanders | | 285/110 |
| 3,295,689 A * | 1/1967 | Savas | | 210/259 |
| 3,686,835 A * | 8/1972 | Strange et al. | | 96/417 |
| 3,749,250 A * | 7/1973 | Oldford | | 210/448 |
| 3,794,180 A * | 2/1974 | Blocker | | 210/445 |
| 3,931,015 A * | 1/1976 | Jenkins | | 210/232 |
| 4,083,660 A * | 4/1978 | Newbrough | | 417/108 |
| 4,087,120 A * | 5/1978 | Rumble | | 285/39 |
| 4,146,254 A * | 3/1979 | Turner et al. | | 285/105 |
| 4,157,902 A * | 6/1979 | Tokar | | 55/385.3 |
| 4,220,459 A * | 9/1980 | Hammond et al. | | 55/341.1 |
| 4,244,718 A * | 1/1981 | Noddin | | 55/377 |
| 4,251,374 A * | 2/1981 | Cunningham | | 210/232 |
| 4,270,935 A * | 6/1981 | Reinauer | | 55/379 |
| 4,304,579 A * | 12/1981 | Granville et al. | | 55/381 |
| 4,435,197 A * | 3/1984 | Nijhawan et al. | | 55/341.7 |
| 4,493,717 A * | 1/1985 | Berger et al. | | 55/330 |
| 4,779,902 A * | 10/1988 | Lee | | 285/260 |
| 4,946,483 A * | 8/1990 | Coral | | 55/323 |
| 4,961,598 A * | 10/1990 | Sundholm | | 285/94 |
| 5,015,014 A * | 5/1991 | Sweeney | | 285/81 |
| 5,026,478 A * | 6/1991 | Tanabe et al. | | 210/232 |
| 5,078,430 A * | 1/1992 | St. Onge | | 285/15 |
| 5,188,731 A * | 2/1993 | Lapoint, Jr. | | 210/232 |
| 5,202,021 A * | 4/1993 | Griffin et al. | | 210/232 |
| 5,252,210 A * | 10/1993 | Kessel | | 210/452 |
| 5,267,757 A * | 12/1993 | Dal Palu | | 285/148.21 |
| 5,277,704 A * | 1/1994 | Miller et al. | | 55/321 |
| 5,441,650 A * | 8/1995 | Kirsgalvis | | 210/767 |
| 5,549,826 A * | 8/1996 | Lapoint, Jr. | | 210/489 |
| 5,624,559 A * | 4/1997 | Levin et al. | | 210/447 |
| 5,643,451 A * | 7/1997 | Harris et al. | | 210/448 |
| 5,672,273 A | 9/1997 | Ball | | |
| 5,683,116 A * | 11/1997 | Folkers | | 285/18 |
| 5,918,914 A * | 7/1999 | Morris | | 285/351 |
| 6,132,483 A * | 10/2000 | Andrews | | 55/385.1 |
| 6,939,465 B2 * | 9/2005 | Dupre | | 210/248 |
| 7,175,030 B2 * | 2/2007 | Fall et al. | | 210/474 |
| 7,488,010 B2 * | 2/2009 | Wellman et al. | | 285/364 |
| 2006/0042708 A1 * | 3/2006 | Stowe | | 138/89 |

* cited by examiner

FILTERING DEVICE

CROSS REFERENCE TO RELATED APPLICATIONS

This application is US National Stage Entry of international patent application no. PCT/EP2007/059297, filed Sep. 5, 2007 designating the United States of America, the entire disclosure of which is incorporated herein by reference. Priority is claimed based on Federal Republic of Germany patent application no. 20 2006 015 784.0, filed Oct. 12, 2006.

TECHNICAL FIELD

The invention concerns a filtering device, in particular for the filtration of combustion air in internal combustion engines.

PRIOR ART

EP 0 450 299 A1 discloses a filtering device for the filtration of combustion air in internal combustion engines that comprises a zigzag-shaped folded filter element arranged in a plate shape in a filter housing. The filtering device is arranged in the intake manifold of the internal combustion engine wherein the combustion air to be purified is supplied through pipe conduits to the unfiltered side of the filter element, is filtered upon passing through the filter element, and is subsequently discharged through the filtered side of the filter element and further pipe sections and supplied to the cylinder inlets of the internal combustion engine.

The filtration of the combustion air is very important for proper functioning of the internal combustion engine as well as the auxiliaries of the internal combustion engine, for example, a compressor. Bypass flows of air that bypass the filter element must therefore be prevented. This requires, on the one hand, a safe and fixed seat of the filter element in the flow path of the combustion air and, on the other hand, the filter element must be easily exchangeable for regular maintenance.

SUMMARY OF THE INVENTION

The invention has the object to provide with simple constructive measures a filtering device in which bypass flows of air bypassing the filter element are safely prevented and that, at the same time, is distinguished by a simple exchangeability of the filter element.

The filtering device according to the invention is suitable particularly for the filtration of combustion air in internal combustion engines, moreover in general for the filtration of gaseous and optionally liquid fluids. The filter element of the filtering device is hose-shaped and is comprised, for example, of a soft, yielding nonwoven-type filter material that usually is comprised of synthetic base materials, for example, on the basis of polymers, but also of natural materials, in particular on the basis of cellulose. As an alternative to a soft material also a stiff material or a stiff configuration can be considered in which packing of the folds is prevented. This hose-like filter element is secured on a support part wherein the support part is insertable between a pipe for unfiltered fluid and a pipe for filtered fluid that are to be combined to a continuous flow pipe. In the mounted state the hose-shaped filter element is arranged in the interior of the flow pipe.

This configuration has in comparison to the prior art various advantages. On the one hand, the filter element can be easily exchanged because the filter element together with the support part constitutes an exchangeable module that, for example, for maintenance purposes, can be removed from the pipe assembly and, after maintenance or exchange of the filter element, can be reinserted. Moreover, the risk of bypass flows is avoided because the support part is seated in a fixedly predetermined position seal-tightly between the fluid pipes and, on the other hand, the filter element is connected fixedly to the support part. Improper seating of the support part between the fluid pipes, for example, caused by vibrations or improper mounting, is thus practically precluded. The same holds true for bypass flows that could bypass the filter element because the attachment of the filter element on the support part can be performed outside of the mounting space so that no mounting-related errors can occur when installing the filter element.

The support part is expediently sleeve-shaped and comprises a support sleeve as well as a radially inwardly displaced fastening projection on which an end face section of the hose-shaped filter element is secured. The fastening projection is annular and is positioned in the mounting position between the axial end faces of the unfiltered fluid pipe and the filtered fluid pipe. In an expedient embodiment the inner diameter of the fastening projection and of the unfiltered fluid/filtered fluid pipes are identical. The support sleeve of the support part that surrounds radially the fastening projection engages expediently also the end face sections of the fluid pipes radially in such a way that a seal-tight seating of the support part is provided. The support part forms in this embodiment an intermediate pipe section for connection of the facing end faces of the fluid pipes.

The filter element is expediently secured on an axial side of the fastening projection and, in the mounted state, is clamped between this axial side and the end face of the fluid pipe. In this connection, it can inexpedient that the filter element is fixedly, in particular non-detachably, connected to the support part, for example, by means of gluing. On the other hand, it is possible to mount the filter element detachably on the support part. The attachment of the filter element on the support part ensures the modular configuration of support part and filter element as a mating unit.

Expediently the end section of the filter element is clamped between the end face of the unfiltered fluid pipe and the fastening projection on the support part. The hose-shaped filter element extends, based on the mounted position, in the interior of the flow pipe into the filtered fluid pipe. Between the support part, in particular the support sleeve and the wall of the filtered fluid pipe, an additional sealing ring can be positioned in order to prevent bypass flows.

According to an expedient further embodiment, the support part in the mounted position is detachably connected to the fluid pipes, for example, by means of a locking or a snap-on connection in order to be able to open the assembly and to easily exchange, as needed, the module comprised of support part and filter element. This locking connection is provided in particular between the radially engaging support sleeve and a corresponding locking part on the exterior wall of each fluid pipe.

According to a further advantageous embodiment the filter wall of the hose-shaped filter element can have an additional fastening site relative to a component that, in particular, is also the support part. In this embodiment, not only an axial end face of the filter element is annularly and seal-tightly secured on the support part but at least one part of the filter element is connected at an additional fastening site to the support part. As a result, this leads to a shape of the filter hose with two pockets that extend parallel approximately in the flow direction. The advantage of this embodiment resides in a significantly reduced axial length of the filter element that is reduced approximately to one half while having at the same time approximately the same filter surface area. The required mounting space in the axial direction is significantly reduced by this. Moreover, a better flow through the filter element can be realized.

BRIEF DESCRIPTION OF THE DRAWINGS

Further advantages and expedient embodiments are disclosed in the further claims, the figure description, and the drawings. It is shown in:

FIG. 3 in a schematic illustration a section of the support part and a hose-shaped filter element in an alternative embodiment, with attachment to the unfiltered fluid and filter fluid pipes.

In the Figures same components are identified with same reference numerals.

EMBODIMENTS OF THE INVENTION

Figure 1:
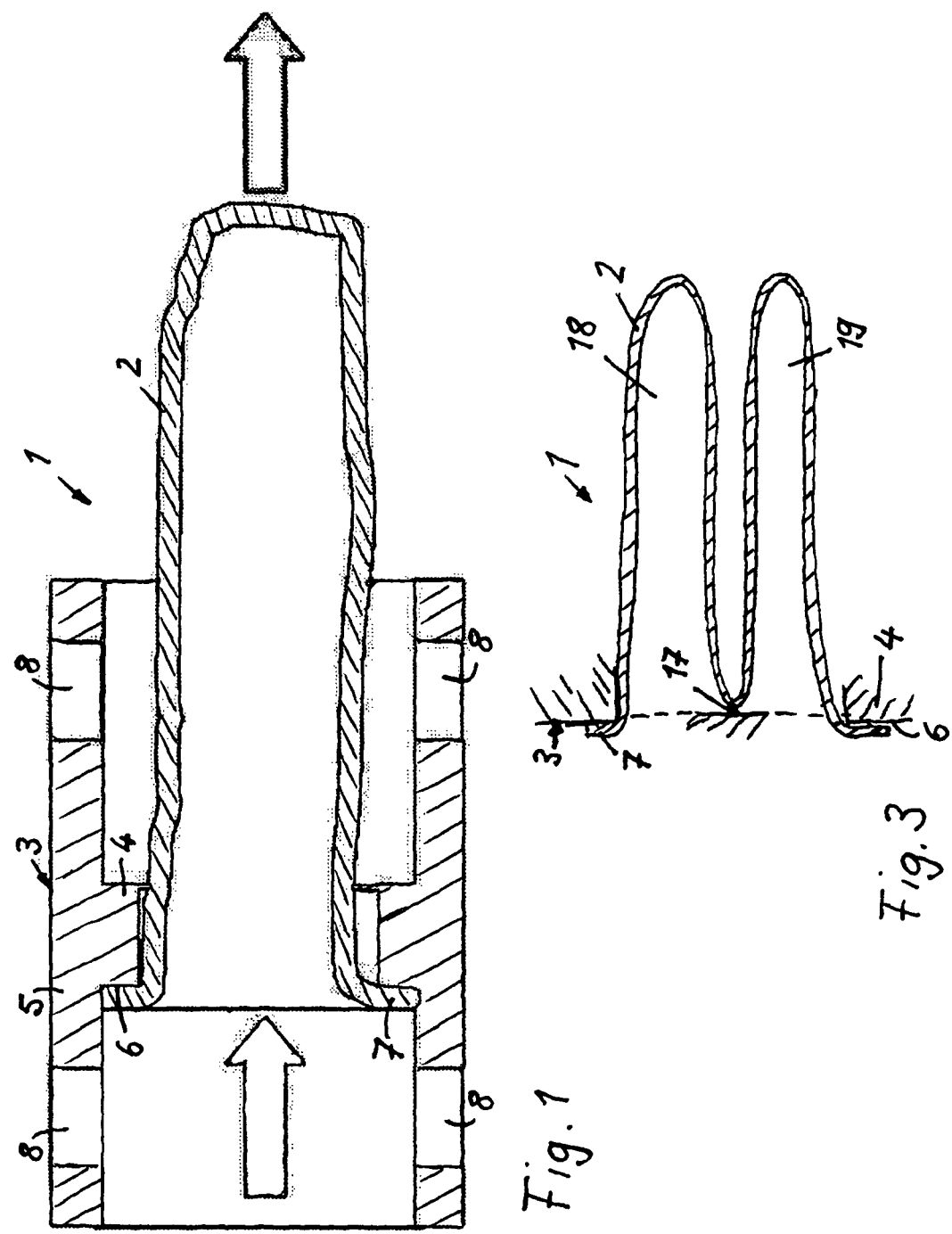
FIG. 1 in longitudinal section a hose-shaped filter element that is secured on a sleeve-shaped or tubular support part and is flown through axially by a fluid to be filtered.

In FIG. 1, a filter module 1 is illustrated comprised of a hose-shaped filter element 2 of soft, yielding material and a support part 3 that is configured as the sleeve or a tubular member and to which is secured the filter element 2 in a safe and optionally also detachable way. Filter element 2 and support part 3 form a mating unit that is premanufactured outside of its location of use and is installed as a modular unit 1. The filter module 1 is used in particular for filtration of combustion air in internal combustion engines. The flow direction of the fluid to be purified is in the axial direction as indicated by the illustrated arrows. The flow direction can also be in the opposite direction, i.e., in the direction opposite to the illustrated arrows, so that the wall of the hose-shaped filter element can also be flown through from the exterior to the interior.

The support part 3 is comprised of a radially inwardly positioned annular fastening projection 4, wherein the end face section of the filter element 2 rests against its end face 6, as well as a radially surrounding axially significantly longer support sleeve 5, wherein the support sleeve 5 and the fastening projection 4 form a monolithic component that, however, optionally can also be embodied of two parts. Adjacent to the axial end faces of the support sleeve 5, the wall of the support sleeve 5 is provided with several locking recesses 8 that are advantageously distributed about the circumference. The locking recesses 8 serve for anchoring fixedly but releasably the support part 3 between the fluid pipes illustrated in FIG. 2.

Figure 2:
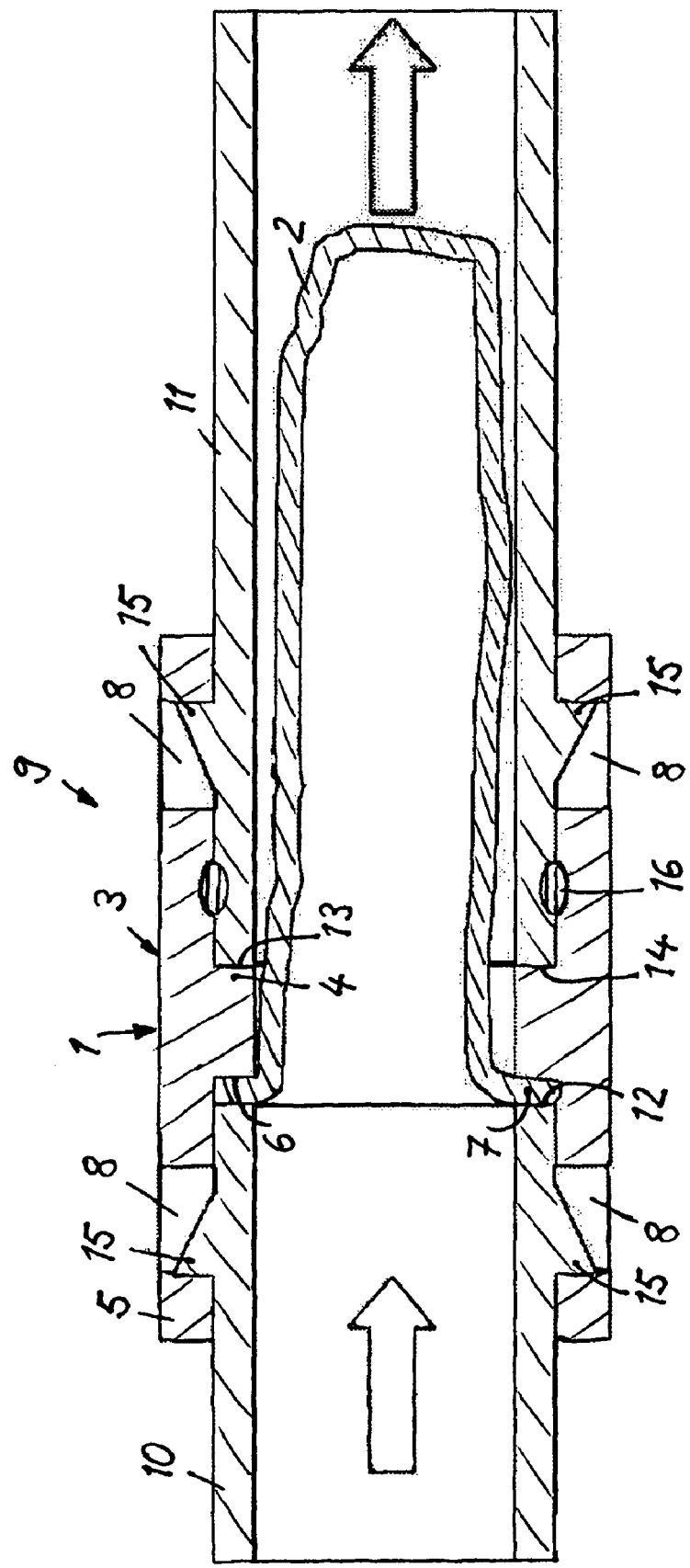
FIG. 2 a filtering device in longitudinal section, comprised of two fluid pipes, between which the support part and the hose-shaped filter element according to FIG. 1 are inserted.

In FIG. 2, a filtering device 9 is illustrated that is comprised of a two-part flow pipe with an unfiltered fluid pipe 10 and a filtered fluid pipe 11, wherein the pipes 10 and 11 are arranged coaxially to one another, as well as the filter module 1 as a connecting member between the pipes 10 and 11. The filter module 1 with the filter element 2 and the support part 3 forms an exchangeable and easily mountable unit that is positioned between the end faces of the fluid pipes 10 and 11.

In the mounted position according to FIG. 2, the end face section 7 of the filter element 2 is fixedly and seal-tightly clamped between the end face 6 of the fastening projection 4 and the facing end face 12 of the unfiltered fluid pipe 10. The opposite end face 13 of the fastening projection 4 is resting immediately against the end face 14 of the filtered fluid pipe 12. In this way, the annual fastening projection 4 provides across its axial length an intermediate pipe section between the facing end faces 12 and 14 of the pipes 10 and 11.

The support sleeve 5 of the support part 3 surrounds the axially positioned end face sections of each pipe 10 and 11. On the outer wall of the pipe 10 and 11 locking noses 15 are formed that engage lockingly the matching locking recesses 8 in the support sleeve 5 so that the pipes and the support part are locked in the axial direction. The locking recesses 8 and locking noses 15 form together locking means by means of which a releasable locking or snap-on connection between the unfiltered fluid pipe 10 and the filter fluid pipe 11 and the support part 3 can be produced.

For a seal-tight connection and for avoiding bypass flows a sealing ring 16 is arranged on the support part 3 between the exterior wall of the filtered fluid pipe and the inner wall of the support sleeve 8.

In FIG. 3 a further embodiment of a filter module 1 is illustrated that is insertable between two fluid pipes. The filter element 2 is embodied in a hose shape as in the first embodiment wherein the open end face section 7 of the filter element is secured fixedly to the end face 6 on the fastening projection 4 of the support part 3. In contrast to the preceding embodiment, the hose-shaped filter element 2 which is comprised of soft and yielding filter material has an additional fastening site 17 relative to the support part 3 wherein this additional fastening site 17 is arranged axially at the same level as the end face 6 on the support part. On the fastening site 17 a point of the closed-off end face of the filter hose in the unfolded state is attached; this has the result that in the filter hose two pockets 18 and 19 are formed that extend approximately parallel to one another and extend in the axial or flow direction and each form a filter bag. In this way, the axial length of the filter element 2 can be reduced to approximately half its length.

The filtering device is suitable in particular for the filtration of combustion air in internal combustion engines. However, an application is also possible for the filtration of the interior air of a motor vehicle or, generally, for the filtration in motor vehicles.

The invention claimed is:

1. A filtering device for the filtration of combustion air in internal combustion engines, comprising
    a soft yielding flexible filter element (2) of woven or nonwoven synthetic polymers or cellulose, arranged in a filter housing,
    wherein the filter element (2) is hose-shaped,
    wherein a wall of the filter element (2) radially separates an unfiltered side and a filtered side,
    in that the hose-shaped filter element (2) is secured within a tubular sleeve support part (3), and
    in that the support part (3) is insertable between and detachably connected to an unfiltered fluid pipe (10) and a filtered fluid pipe (11) that are to be combined to a continuous flow pipe,
    wherein the support part (3) comprises a support sleeve (5) wall that radially surrounds axial end faces (12 and 14) of the unfiltered fluid and filtered fluid pipes (10 and 11),
    wherein the filter element (2) is located in an interior of the flow pipe,
    wherein the support part (3) includes
        a radially inwardly displaced fastening projection (4) secured to an inner wall of said tubular sleeve support part and extending radially inwardly from said inner wall into an open interior of said support part, said fastening projection including axially spaced opposing axial end faces (6,13) on opposing axial sides (6,13) of said fastening projection (4), wherein an end face (7) of said filter element (2) is sealtightly axially clamped between a first one of said axially spaced opposing axial end faces (6,13) of said fastening projection and a facing axial end face (12,14) of one of said fluid pipes (10,11), wherein a second one of said axially spaced opposing axial end faces (6,13) of said fastening projection rests immediately against a facing axial end face (12,14) of a different one of said fluid pipes (10,11), wherein the end face section (7) of the hose-shaped filter element (2) rests immediately against at least one of the end faces (12 and 14) of the fluid pipe pipes (10 and 11), wherein the end face section (7) of the hose-shaped filter element (2) is clamped between and against the end face (12 or 14) of fluid pipe (10 or 11) and the support part (3), wherein said wall of said support part (3) includes locking recesses (8) extending through said wall from an interior to an exterior of said support sleeve, said locking recesses (8) detachably engaging locking noses (15) in said fluid pipes, connecting said fluid pipes together through said support part (3) by a releasable snap-in locking connection.

2. Filtering device according to claim 1, wherein
on the fastening projection (4) an end face section (7) of the hose-shaped filter element (2) is secured.

3. Filtering device according to claim 1, wherein
the support part (3) comprises a support sleeve (5) that radially surrounds axial end faces (12 and 14) of the unfiltered fluid and filtered fluid pipes (10 and 11).

4. Filtering device according to claim 1, wherein
the filter wall of the hose-shaped filter element (2) is connected by means of an additional fastening site (17) to a component.

5. Filtering device according to claim 4, wherein
the additional fastening site (17) is located on the support part (3) so that in the filter element (2) two parallel extending pockets (18, 19) extending in the flow direction are provided.

6. Filtering device according to claim 1, wherein
a sealing ring (16) contacts and seals between an axially extending inner wall of the support part (3) and an axially extending exterior wall of at least one of the fluid pipes (10, 11).

7. The filter device according to claim 2, wherein the filter wall of the hose-shaped filter element (2) is connected by means of an additional fastening site (17) to a component.

8. The filtering device according to claim 7, wherein
the additional fastening site (17) is located on the support part (3) so that in the filter element (2) two parallel extending pockets (18, 19) extending in direction of flow are provided.

9. The filtering device according to claim 7, wherein
a sealing ring contacts and seals between an axially extending inner wall of the support part (3) and an axially extending exterior wall of at least one of the fluid pipes (10, 11).

10. The filtering device according to claim 1, wherein said filtering device including said support part and said hose shaped filter element is a modular one piece component with the filter element connected fixedly to the support part, wherein said filtering device including said support part and said hose shaped filter element is provided and replaced in one piece as a unit.

11. The filtering device according to claim 10, wherein
a sealing ring contacts and seals between an axially extending inner wall of the support part and an axially extending exterior wall of at least one of the fluid pipes.

12. The filtering device according to claim 1, wherein said filtering device including said support part and said hose shaped filter element is a modular one piece component with the filter element connected fixedly to the support part, wherein said filtering device including said support part and said hose shaped filter element is provided and replaced in one piece as a unit.

13. The filtering device according to claim 12, wherein
a sealing ring contacts and seals between an axially extending inner wall of the support part and an axially extending exterior wall of at least one of the fluid pipes.

* * * * *